United States Patent
Frensch et al.

(10) Patent No.: US 9,999,975 B2
(45) Date of Patent: Jun. 19, 2018

(54) METHOD AND SYSTEM FOR OPERATING AND/OR MONITORING A MACHINE, IN PARTICULAR A ROBOT

(71) Applicant: KUKA Roboter GmbH, Augsburg (DE)

(72) Inventors: Ewald Frensch, Kissing (DE); Torsten Geiler, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 155 days.

(21) Appl. No.: 15/176,676

(22) Filed: Jun. 8, 2016

(65) Prior Publication Data

US 2016/0354926 A1 Dec. 8, 2016

(30) Foreign Application Priority Data

Jun. 8, 2015 (DE) ........................ 10 2015 007 395

(51) Int. Cl.
*B25J 9/16* (2006.01)

(52) U.S. Cl.
CPC ............ *B25J 9/1666* (2013.01); *B25J 9/1676* (2013.01); *G05B 2219/39082* (2013.01); *G05B 2219/40476* (2013.01)

(58) Field of Classification Search
CPC ...... B25J 9/1666; B25J 9/1676; B25J 9/1605; B25J 9/163; B25J 9/1671; B25J 9/1664; B25J 9/1674; B25J 16/1666; B25J 16/1676; G05B 19/4061; G05B 2219/49137; G05B 2219/49145; G05B 2219/49148; G05B 2219/49157
See application file for complete search history.

(56) References Cited

U.S. PATENT DOCUMENTS

| | | | |
|---|---|---|---|
| 5,347,459 A | 9/1994 | Greenspan et al. | |
| 5,548,694 A | 8/1996 | Gibson | |
| 2009/0326711 A1* | 12/2009 | Chang | B25J 9/1666 700/248 |
| 2010/0292843 A1* | 11/2010 | Kariyazaki | B25J 9/1676 700/264 |
| 2014/0025203 A1 | 1/2014 | Inazumi | |

FOREIGN PATENT DOCUMENTS

| | | |
|---|---|---|
| CN | 101888920 A | 11/2010 |
| CN | 102497382 A | 6/2012 |
| CN | 102814813 | 12/2012 |

(Continued)

OTHER PUBLICATIONS

European Patent Office; Search Report in European Patent Application No. 16001175.5 dated Oct. 13, 2016; 15 pages.

(Continued)

*Primary Examiner* — Adam R Mott
(74) *Attorney, Agent, or Firm* — Wood Herron & Evans LLP

(57) ABSTRACT

A method for operating and/or monitoring a machine, in particular, a multiple axis robot, includes determining whether an outer border of a first spatial area and an outer border of a second spatial area intersect each other, and detecting a penetration of the first spatial area by the second spatial area, in the event that the two outer borders intersect each other, wherein one of the two spatial areas is machine-fixed.

20 Claims, 2 Drawing Sheets

(56) References Cited

FOREIGN PATENT DOCUMENTS

| | | |
|---|---|---|
| CN | 103568022 A | 2/2014 |
| DE | 69027634 T2 | 11/1996 |
| DE | 19625637 A1 | 1/1998 |
| DE | 10152543 A1 | 5/2003 |
| DE | 10324627 A1 | 1/2005 |
| DE | 102006055360 A1 | 6/2007 |
| DE | 102007037077 A1 | 2/2009 |
| DE | 102012103830 A1 | 11/2012 |
| EP | 1604790 A2 | 12/2005 |
| JP | 2009279748 A | 12/2009 |
| JP | 201421810 A | 2/2014 |

OTHER PUBLICATIONS

Duffy et al; Publication entitled "Real-time Collision Avoidance System for Multiple Robots Operating in Shared Work-space" dated Nov. 1989; 7 pages.
Korean Patent Office; Examination Report in Korean Patent Application No. 10-2016-0069478 dated Jul. 25, 2017; 11 pages.
German Patent Office; Search Report in German Patent Application No. 10 2015 007 395.8 dated Apr. 22, 2016; 5 pages.
Chinese Patent Office; Office Action in Chinese Patent Application No. 201610402925 dated Feb. 24, 2018; 16 pages.

* cited by examiner

METHOD AND SYSTEM FOR OPERATING AND/OR MONITORING A MACHINE, IN PARTICULAR A ROBOT

CROSS-REFERENCE TO RELATED APPLICATIONS

This application claims the benefit of priority under 35 U.S.C. § 119(a) to German Patent Application DE 10 2015 007 395.8, filed Jun. 8, 2015 (pending), the disclosure of which is hereby incorporated by reference in its entirety.

TECHNICAL FIELD

The present invention relates to a method and a system for operating and/or monitoring at least one machine, in particular, at least one multiple axis robot, as well as a computer program product for carrying out a method.

BACKGROUND

It is known to approximate robots or, more specifically, their links by means of individual primitives, in particular, for planning collision-free paths and for monitoring robots for collisions.

In contrast, U.S. Pat. No. 5,347,459A proposes approximating each link of a robot by means of a plurality of spheres, assigning three dimensional voxels to the distances from obstacles and detecting a collision, if a radius of a sphere in a three dimensional voxel exceeds the distance, which said voxel occupies.

The object of the present invention is to improve the operation of a machine, in particular, a robot.

SUMMARY

According to one aspect of the present invention, when operating and/or monitoring a moveable machine, in particular, a multiple axis robot, it is determined, in particular, by a means of a system that is configured, in particular, as hardware and/or software for this purpose, whether an outer border of a first spatial area and an outer border of a second spatial area intersect each other, where in this case one of the two spatial areas is fixed relative to the machine, and, a penetration of the first spatial area by the second spatial area is detected, in particular, by a means of the system that is configured, in particular, as hardware and/or software for this purpose, in the event that (it is determined that) the two outer borders intersect each other.

In one embodiment the operation may comprise, in particular, may be, in particular, the planning or, more specifically, the specification of the motion, in particular, the path of the machine, in particular, the robot, in particular, before and/or during the operation or, more specifically, off-line and/or on-line. In one embodiment the monitoring may comprise, in particular, may be, in particular, a, in particular, safe collision monitoring, in particular, before the operation, in particular, for or during a motion planning, in particular, path planning, and/or during the operation or, more specifically, off-line and/or on-line.

In one embodiment the first and second spatial areas are two dimensional or three dimensional (sub)areas of a Cartesian space. The outer border of the first spatial area and/or the outer border of the second spatial area is and/or are closed in one embodiment.

In one embodiment the machine-fixed spatial area is or will be defined and/or specified and/or described in relation to the machine, in particular, the robot. In one embodiment said machine-fixed spatial area may move along with the machine, in particular, a link of the robot and/or may be fixed in location relative to said link of the robot. In one embodiment the machine-fixed spatial area is or will be constantly defined or, more specifically, specified in relation to the machine, in particular, the robot. In another embodiment said machine-fixed spatial area is variable, in particular, as a function of an operating state, in particular, a position, of the machine. In one embodiment the machine-fixed spatial area envelops a moveable link of the machine, in particular, the robot.

In one embodiment the other of the spatial areas is or will be defined and/or specified and/or described in relation to the surrounding, in particular, a basis of the robot. In one embodiment the other surrounding-fixed spatial area is or will be constantly defined or, more specifically, specified in relation to the surrounding. In another embodiment said other surrounding-fixed spatial area is variable, in particular, as a function of an operating state, in particular, a position, of the machine, a surrounding operating parameter, such as, for example, a position of a door, a conveyor belt or the like, and/or is time-dependent. The surrounding-fixed spatial area makes or will make it possible to define and/or describe, in particular, a safe area that is blocked and, hence, inaccessible to the machine.

In an additional embodiment the other of the spatial areas is and/or will be defined and/or specified and/or described in relation to another machine, in particular, another multiple axis robot. In one embodiment said other spatial area may move along with the other machine, in particular, a link of the other robot and/or may be fixed in location relative to said link of the other robot. In one embodiment the other spatial area, which is fixed relative to the other machine, is or will be constantly defined or, more specifically, specified in relation to the other machine, in particular, the other robot. In another embodiment said other spatial area is variable, in particular, as a function of an operating state, in particular, a position, of the other machine. Such an additional spatial area makes it possible to detect and/or avoid, in particular, a collision of cooperating machines, in particular, robots. Correspondingly in one embodiment the other spatial area envelops a moveable link of the other machine, in particular, the other robot.

It was recognized according to the invention that (at least) one cut of the outer borders of two spatial areas is a necessary prerequisite for a penetration of the one spatial area by the other spatial area and, thus, can be used to positively detect such a penetration. In this context any contact of the two outer borders at a point is defined, broadly speaking, as a cut for the sake of a more compact description.

In one embodiment checking for a cut of the outer borders makes it possible in an advantageous way to dispense with computing the distance and/or with checking, in particular, completely checking all of the (inner) spatial areas or makes it possible to at least simplify the checking operation and, as a result, in particular, to speed up the checking.

According to the invention, it was also recognized that a sufficient requirement for the other spatial area not to have penetrated into a spatial area is that the two outer borders do not intersect each other and, in addition, that neither one of the two areas lies completely in the other of the two areas.

Correspondingly in one embodiment it is detected, in particular, by a means of the system, which is configured, in particular, as hardware and/or software for this purpose, that there is no penetration of the first spatial area by the second spatial area, in the event that the two outer borders do not intersect each other and, in addition, neither one of the two areas lies completely in the other of the two areas.

For this purpose in one embodiment one of the two areas or both areas may be or will be defined (in each case), in particular, by a means, which is configured, in particular, as hardware and/or software for this purpose, in such a way that said area cannot lie completely in the (respective) other of the two areas.

In a further development the respective area may be or will be defined, according to or by its (their) size, in particular, by the means in such a way that said area cannot lie completely in the (respective) other of the two areas, for example, in that a maximum size of the one area is larger than a maximum size of the other of the two areas.

In addition or as an alternative, in a further development the respective area may be or will be defined, according to or by its (their) shape, in particular, by the means in such a way that said area cannot lie completely in the (respective) other of the two areas.

In addition or as an alternative to a choice of at least one of the two areas in such a way that it cannot lie completely in the other of the two areas, in one embodiment it is determined (in each case), in particular, by a means, which is configured, in particular, as hardware and/or software for this purpose, whether at least, in particular, exactly, one selected point of one spatial area, in particular, its outer border, lies inside the (respective) other area, and it is detected that this one spatial area does not lie completely in the other area, in the event that the selected point(s) does not lie or do not lie inside the other area.

In one embodiment one of the outer borders or both outer borders are and/or will be described, in particular, temporarily or permanently stored, by a means of the system, which is configured, in particular, as hardware and/or software for this purpose, (in each case) by means of discrete three dimensional elements, in particular, voxels and/or rectangular parallelepipeds, in particular, cubes. As a result, in one embodiment the description of the spatial areas and/or the determination of cuts and/or included points can be improved, in particular, simplified and/or speeded up.

In a further development of the invention the discrete three dimensional elements, by means of which one of the outer borders is or will be described, have a maximum and/or minimum size of at most 1 m, in particular, at most 50 cm, in particular, at most 10 cm, in particular, at most 5 cm. In addition or as an alternative, in a further development of the invention the discrete three dimensional elements, by means of which one of the outer borders is or will be described, have a maximum and/or minimum size of at least 0.1 mm, in particular, at least 1 mm, in particular, at least 1 cm. As a result, in one embodiment it is possible to combine in an advantageous way a sufficient accurate discretization, on the one hand, and, on the other hand, an advantageously low, in particular, number of computer instructions.

In one embodiment both outer borders are or will be described, in particular, stored, in particular, by the means, in each case by means of a list of discrete three dimensional elements, in particular, voxels and/or cubes, wherein in a further development the discrete three dimensional elements, which describe an outer border, are identical and/or are equal to one or more three dimensional elements, in particular, at least in essence all of the three dimensional elements, which describe the other outer border, in particular, according to shape and/or size.

Then it is determined, in particular, by a means of the system that is configured, in particular, as hardware and/or software for this purpose, whether at least one element of a list and at least one element of the other list have at least one common point, and it is detected that the two outer borders intersect each other, in the event that it is detected that at least one element of the one list and at least one element of the other list have at least one common point. As a result, in one embodiment the determination of cuts can be improved, in particular, simplified and/or speeded up. In one embodiment the checking is already terminated and it is found that the two outer borders intersect each other, as soon as a first common point has been determined.

For this purpose in a further development of the invention, the three dimensional elements of at least one of the two lists are and/or will be transformed into a common reference system, in particular, by a means of the system that is configured, in particular, as hardware and/or software for this purpose. In a further development of the invention a corresponding transformation may comprise, in particular, may be a linear mapping. As a result, in one embodiment the determination of cuts and/or included points may be improved, in particular, simplified and/or speeded up.

In addition or as an alternative, the three dimensional elements of at least one of the two lists are sorted, in particular, by a means of the system that is configured, in particular, as hardware and/or software for this purpose, in particular, according to ascending or descending distance between the three dimensional elements and/or the distance from a reference, in ascending or descending sequence of the element indices or the like. As a result, in one embodiment the determination of cuts and/or included points may be improved, in particular, simplified and/or speeded up.

In a further development of the invention, it is determined, in particular, by a means of the system that is configured, in particular, as hardware and/or software for this purpose, whether the two lists have at least one common three dimensional element, and it is detected that the two outer borders intersect each other, in the event that (it is detected that) the two lists have at least one common three dimensional element. As a result, in one embodiment the determination of cuts and/or included points may be improved, in particular, simplified and/or speeded up.

In one embodiment one or more of the steps described herein are carried out and/or executed in either a partially or completely automated way.

In a further development of the invention, a penetration of the first spatial area by the second spatial area is checked multiple times, in particular, cyclically and/or for certain positions of the machine by, in particular, a means of the system that is configured, in particular, as hardware and/or software for this purpose. In addition or as an alternative, in a further development of the invention, a penetration of the first spatial area by one or more additional second spatial areas and/or a penetration of one or more additional first spatial areas by the second spatial area, in a further development of the invention, also by one or more additional second spatial areas, is and/or are checked multiple times, in particular, cyclically and/or for certain positions of the machine in the manner, described herein, by, in particular, a means of the system that is configured, in particular, as hardware and/or software for this purpose.

A means within the context of the present invention may be designed in hardware and/or software. In particular, said means may comprise a processor, in particular, a digital processor, in particular, a microprocessor unit (CPU) which is preferably data connected or, more specifically, signal connected to a memory system and/or a bus system, and/or may comprise one or more programs or program modules.

In addition, the CPU may be designed to process commands, which are implemented as a program that is stored in a memory system, to acquire input signals from a data bus and/or to send output signals to a data bus. A memory system may be one or more, in particular, different memory mediums, in particular, optical, magnetic solid media and/or other non-volatile media. The program may be created in such a way that it embodies or, more specifically, is able to carry out the methods described herein so that the CPU can carry out the steps of such methods and, as a result, can run or rather monitor the machine.

BRIEF DESCRIPTION OF THE DRAWINGS

Other advantages and features will become apparent from the dependent claims and the embodiments that are shown merely for illustrative purposes. For this purpose the drawings show, to some extent in schematic form:

DETAILED DESCRIPTION

Figure 1:
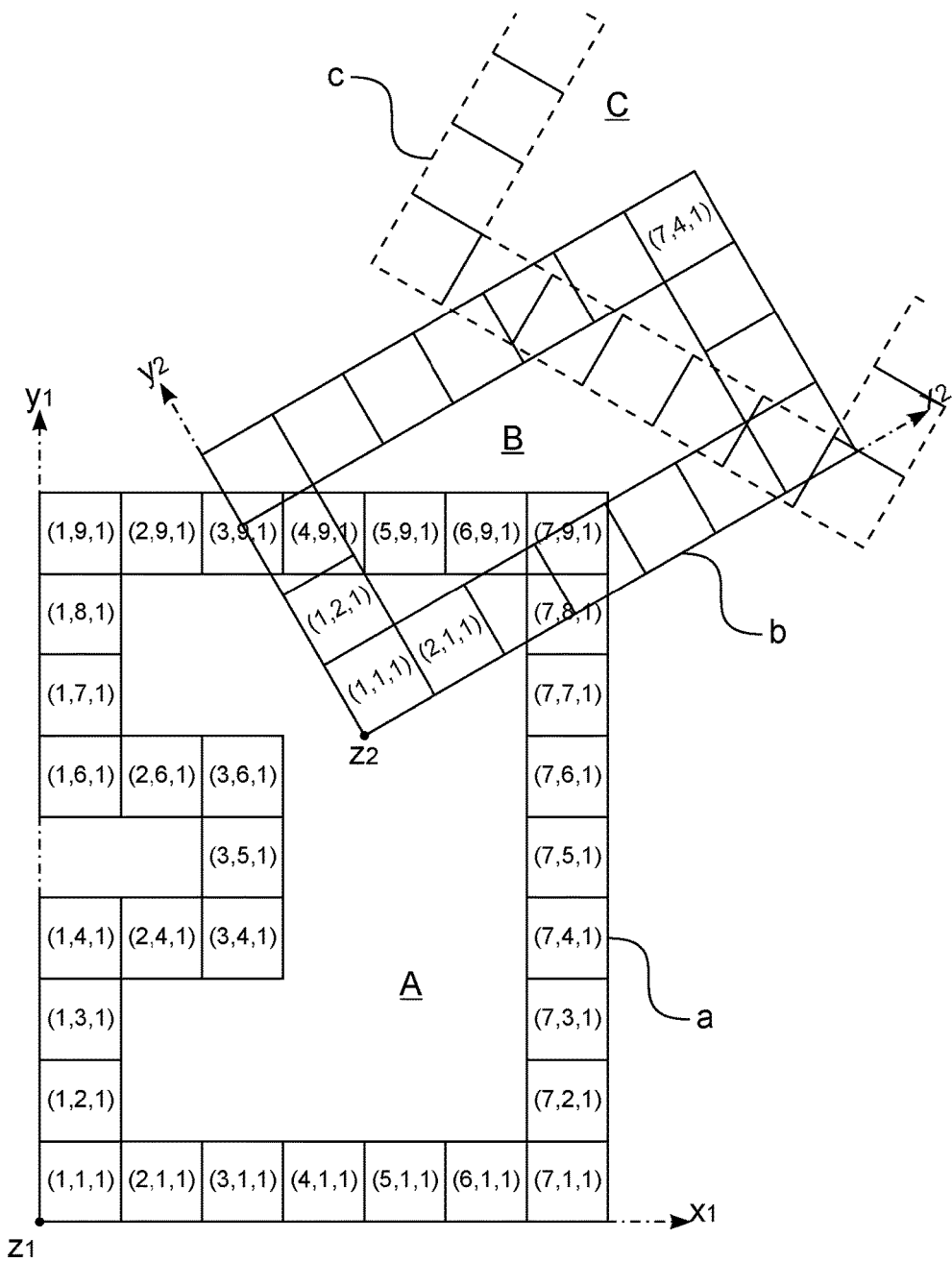
FIG. 1 a first spatial area, a second robot-fixed spatial area, penetrating said first spatial area, and a portion of an additional second robot-fixed spatial area in a step of a method, which is carried out by a system, in accordance with an embodiment of the present invention.

FIG. 1 shows a first spatial area A with a closed outer border a, a second spatial area B with a closed outer border b, and with a dotted line a portion of an additional second spatial area C with a closed outer border c in a sectional view perpendicular to a z axis of a surrounding-fixed reference system $(x_1, y_1, z_1)$.

The second spatial area B is defined so as to be stationary in relation to a tool of a multiple axis robot, which is, moreover, not depicted herein, and completely envelops said tool.

The additional second spatial area C is defined so as to be stationary in relation to a hand of the robot and completely envelops said hand.

The first spatial area A is defined so as to be stationary in relation to a surrounding area and encloses a safe area, into which the robot is prohibited from entering. In an additional embodiment, said first spatial area may also envelop, instead of said safe area, a link of an additional, cooperating robot.

Figure 3:
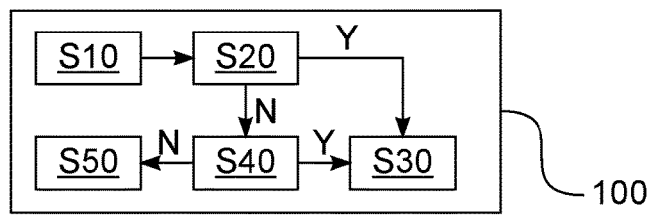
FIG. 3 the sequence of operations of the method in the system.

A method, according to one embodiment of the present invention, where said method is carried out by a system 100 (see FIG. 3) according to an embodiment of the present invention, is explained in more detail below with reference to the monitoring of a penetration of the safe area, described by the first spatial area A, by the second spatial area B, which envelops the tool. Said method can be used in an analogous manner for monitoring a penetration of the safe area by spatial areas, which envelop additional links of the robot, such as, for example, the spatial area C and/or for monitoring a penetration of a spatial area A, which envelops a link of another robot, by a spatial area, which envelops a link of the robot, such as for example, the spatial areas B, C.

The closed outer borders a, b, c are or will be described in each case by means of a list with discrete cubes having a maximum edge length of 10 cm.

In FIG. 1 the cubes of the list {a} of the first spatial area A or, more specifically, its outer border a are identified in the surrounding-fixed reference system $(x_1, y_1, z_1)$ merely for the sake of providing an example. In so doing, the list element "(1, 1, 1)" denotes a cube with a center point in the reference system that exhibits the coordinates (rounded off to whole numbers) $x_1=1$, $y_1=1$ and $z_1=1$; the list element "(2, 1, 1)" denotes a cube with a center point in the reference system that exhibits the coordinates $x_1=2$, $y_1=1$ and $z_1=1$; the list element "(1, 2, 1)" denotes a cube with a center point in the reference system that exhibits the coordinates $x_1=1$, $y_1=2$ and $z_1=1$ and so on. The list elements (1, 1, 1), (2, 1, 1), (3, 1, 1), . . . , (1, 2, 1), . . . (7, 9, 1) are sorted and stored.

Figure 2:
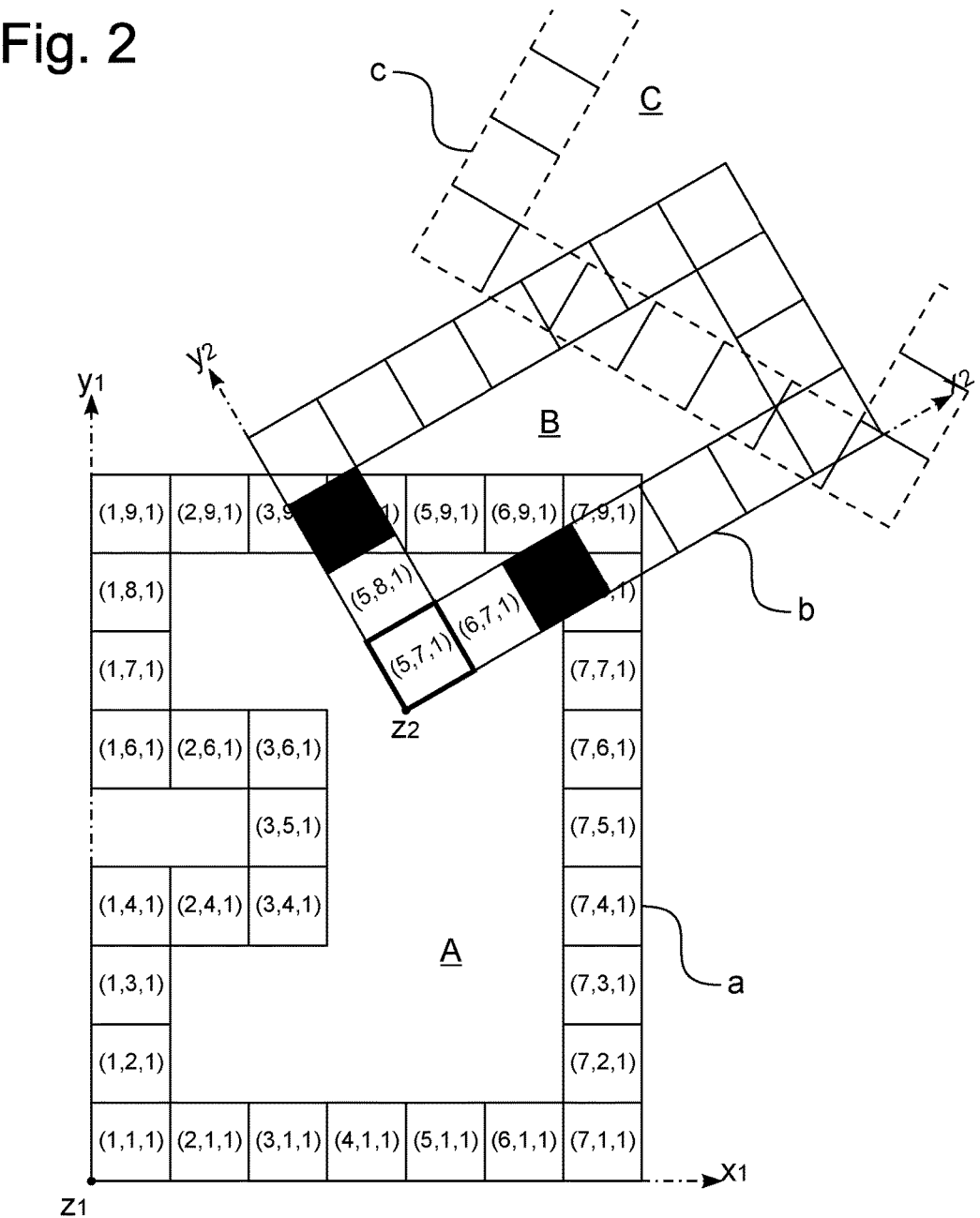
FIG. 2 the spatial areas in another step of the method.

In FIG. 2 the cubes of the list {b} of the second spatial area B or, more specifically, its outer border b are identified in a robot tool-fixed reference system $(x_2, y_2, z_2)$ merely for the sake of providing an example. In so doing, the list element "(1, 1, 1)" denotes a cube with a center point in the robot tool-fixed reference system that exhibits the coordinates (rounded off to whole numbers) $x_2=1$, $y_2=1$ and $z_2=1$; the list element "(2, 1, 1)" denotes a cube with a center point in the robot tool-fixed reference system that exhibits the coordinates $x_2=2$, $y_2=1$ and $z_2=1$; the list element "(1, 2, 1)" denotes a cube with a center point in the robot tool-fixed reference system that exhibits the coordinates $x_2=1$, $y_2=2$ and $z_2=1$ and so on.

In a first step S10 (see FIG. 3) the three dimensional elements of the list {b} of the second spatial area B or, more specifically, its outer border b are transformed into the common, surrounding-fixed reference system $(x_1, y_1, z_1)$. One possible transformation in the form of a linear mapping is shown in FIG. 2. Said transformation is the result of rotating the robot tool-fixed reference system $(x_2, y_2, z_2)$ into the surrounding-fixed reference system $(x_1, y_1, z_1)$ and an addition of the distance vector [4, 6, 0] of the origins of these two reference systems. Correspondingly the transformed list element "(5, 7, 1)" of the list {b} in the common surrounding-fixed reference system $(x_1, y_1, z_1)$ denotes the cube of the second spatial area B or, more specifically, its outer border b, and said cube has a center point in the robot tool-fixed reference system that exhibits the coordinates $x_2=1$, $y_2=1$ and $z_2=1$; the transformed list element "(6, 7, 1)" of the list {b} in the common, surrounding-fixed reference system denotes the cube of the second spatial area B or, more specifically, its outer border b; and said cube has a center point in the robot tool-fixed reference system that exhibits the coordinates $x_2=2$, $y_2=1$ and $z_2=1$; the transformed list element "(5, 8, 1)" of the list {b} in the common, surrounding-fixed reference system denotes the cube of the second spatial area B or, more specifically, its outer border b; and said cube has a center point in the robot tool-fixed reference system that exhibits the coordinates $x_2=1$, $y_2=2$ and $z_2=1$ and so on.

The list elements (5, 7, 1), (6, 7, 1), (5, 8, 1), . . . are sorted and stored.

In a step S20 the system 100 determines whether the outer border a of the first spatial area A and the outer border b of the second spatial area B intersect each other or not.

In addition, the system 100 in step S20 determines whether at least one element of the list {a} and at least one element of the other list {b} have at least one common point.

In addition, the system 100 in step S20 determines whether the two lists {a} and {b} have at least one common three dimensional element.

If the system 100 in step S20 determines that the two lists {a}, {b} have at least one common three dimensional element and, thus, also at least one common point (S20: "Y"), then the system 100 in a step S30 detects that the two outer borders a, b intersect each other and, therefore, a penetration of the first spatial area A by the second spatial area B is present.

This situation is shown in the exemplary embodiment by the feature that the two lists {a}, {b} have the common elements (7, 8, 1) and (4, 9, 1), which are filled in in black in the outer border b for the sake of clarity.

The system 100 terminates the checking operation in step S20 and goes to step S30, as soon as it finds the first common element in the sorted lists {a}, {b}.

In a modification it is possible to check, instead of the common list elements, whether at least one distinct point, for example, a corner point or center point, of at least one cube of the list {b} is in a cube of the list {a}.

If the system 100 has completed the check for a cut of the outer borders {a}, {b} in step S20 without determining a cut (S20: "N"), then said system continues with step S40.

In this step S40 the system 100 checks whether one of the two areas does or does not lie completely in the other of the two areas.

For this purpose the system 100 determines in step S40 whether a selected point of the second spatial area B lies inside the first spatial area A.

In addition, the system 100 determines in step S40 whether the cube, around which a thick frame is drawn in FIG. 2 for the sake of clarity and which is part of the outer border b and which has the coordinates (1, 1, 1) in the robot tool-fixed reference system and which has the coordinates (5, 7, 1) after transformation into the common, surrounding-fixed reference system, lies inside the first area A.

In a modification it is also possible to check, instead of this cube, whether at least one distinct point, for example, a corner point or center point, of a cube of the list {b} lies inside the first area A.

In the present case it is possible to dispense with the reverse checking, since the first spatial area A is defined, according to shape and size, in such a way that it cannot lie inside the second spatial area B. Otherwise, it can also be checked in an analogous manner in step S40 whether, for example, the cube of the outer border a, which has the coordinates (7, 9, 1) in the surrounding-fixed reference system, lies inside the second area B.

If the system 100 detects in step S40 that the selected point of a spatial area lies inside the other area (S40: "Y"), then said system continues with step S30 and finds that a penetration of the first spatial area A by the second spatial area B is present.

Otherwise (S40: "N") the system 100 finds in a step S50 that there is no penetration of the first spatial area A by the second spatial area B, because the two outer borders a, b do not intersect each other (S20: "N"), and neither one of the two areas lies completely in the other of the two areas (S40: "N").

The system 100 carries out the method, described herein, on the basis of a computer program product, in particular, a data carrier or data memory, with a program code, which is stored on a computer readable medium. Correspondingly the elements S10 to S50 can also symbolize means of the system 100.

As explained above, it is also possible to check in the same way the penetrations of the safe area by additional links of the robot, such as, for example, its hand and/or penetrations of other safe areas by one or more links of the robot. In addition or as an alternative, the system 100 can carry out the described method multiple times, in particular, cyclically and/or for certain positions of the robot.

Even though in the preceding description exemplary embodiments were elucidated, it should be noted that a plurality of modifications are possible.

Hence, in one modification the transformed three dimensional elements (5, 7, 1), (6, 7, 1), (5, 8, 1), . . . of the list {b} are not sorted in step S10, but rather in step S20 are looked up individually, in particular, in succession and/or prior to the transformation of the respective next three dimensional element, in the list {a}, and/or it is determined for the transformed three dimensional elements (5, 7, 1), (6, 7, 1), (5, 8, 1) . . . of the list {b} (hence, not (re)sorted), in particular, in succession and/or prior to the transformation of the respective next three dimensional element, whether the transformed three dimensional element and the at least one element of the list {a} have at least one common point, in particular, the list {a} has this transformed three dimensional element. The net result is that the run time and the working memory for sorting the transformed list {b} can be advantageously dispensed with.

In a modification the checking in step S20 is not terminated, as soon as the first common element has been found in the lists {a}, {b}, since such a mandatory (program) jump may take a relatively long time and/or may cause jitter in the computing time. Therefore, in the modification all of the three dimensional elements or, more specifically, the list elements are checked; and at the end in step S20 the common elements are counted, so that the method continues with step S30, if the number of common elements is greater than zero or is another specified limit value, and otherwise with step S40.

Furthermore, it should be pointed out that the exemplary embodiments are merely examples that are not intended to restrict either the application or the configuration in any way. Instead, the preceding description offers the person skilled in the art a guideline for implementing at least one exemplary embodiment, where in this case a variety of changes may be made, in particular, in terms of the function and arrangement of the described components, without departing from the scope of the patent, which will be become apparent from the claims and the combinations of these equivalent features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS 100 system
A first spatial area (surrounding-fixed)
a, b, c outer border
B second spatial area (robot tool-fixed)
C additional spatial area (robot tool flange-fixed)

What is claimed is:
1. A method for at least one of operating or monitoring a multi-axis robot, the method comprising:
   determining with a controller associated with the robot whether a first outer border of a first spatial area and a second outer border of a second spatial area intersect each other;

determining a penetration of the first spatial area by the second spatial area, in the event that the first and second outer borders intersect each other;

wherein one of the first or second spatial areas is machine-fixed;

determining that:
(a) the second spatial area does not penetrate the first spatial area, in the event that the first and second outer borders do not intersect each other, and
(b) neither of the first or second areas lies completely in the other of the first and second spatial areas; and controlling a movement of the robot based on the determining steps.

2. The method of claim 1, further comprising:
determining whether a selected point of one of the first or second spatial areas lies inside the other of the first and second areas; and
determining that the one spatial area does not lie completely in the other area, in the event that the selected point does not lie inside the other area.

3. The method of claim 2, wherein the selected point of the one spatial area is a point of the outer border of the one spatial area.

4. The method of claim 1, wherein at least one of the first or second areas is defined in such a way that the at least one area cannot lie completely in the other of the first and second areas.

5. The method of claim 4, wherein the at least one area is defined according to at least one of the size or shape of the at least one area.

6. The method of claim 1, wherein at least one of the outer borders is described by discrete three-dimensional elements.

7. The method of claim 6, wherein the discrete three-dimensional elements are at least one of voxels or cubes.

8. The method of claim 6, wherein the discrete three-dimensional elements have a maximum or minimum dimension of at least 0.1 mm.

9. The method of claim 6, wherein the discrete three-dimensional elements have a maximum or minimum dimension of up to 1 m.

10. The method of claim 6, wherein the first and second outer borders are described by respective first and second lists of discrete three-dimensional elements, the method further comprising:
determining whether at least one element of the first list and at least one element of the second list have at least one common point; and
determining that the two outer borders intersect each other, in the event that at least one element of the first list and at least one element of the second list have at least one common point.

11. The method of claim 10, wherein the discrete three-dimensional elements of the first and second lists are identical.

12. The method of claim 10, wherein the discrete three-dimensional elements of the first and second lists are at least one of voxels or cubes.

13. The method of claim 10, further comprising:
transforming the three-dimensional elements of at least one of the first or second lists into a common reference system.

14. The method of claim 10, further comprising sorting at least one of the first or second lists.

15. The method of claim 10, further comprising:
determining whether the first and second lists have at least one common three-dimensional element; and
determining that the first and second outer borders intersect each other, in the event that the two lists have at least one common three-dimensional element.

16. The method of claim 1, wherein at least one of the first or second outer borders is closed.

17. The method of claim 1, wherein one of the first or second spatial areas is defined in relation to the robot, and the other of the first and second spatial areas is defined in relation to the surroundings or in relation to another machine.

18. The method of claim 17, wherein the other of the first and second spatial areas is defined in relation to another multi-axis robot.

19. A system for at least one of operating or monitoring a multi-axis robot, the system comprising:
means for determining whether a first outer border of a first spatial area and a second outer border of a second spatial area intersect each other;
means for determining a penetration of the first spatial area by the second spatial area, in the event that the first and second outer borders intersect each other;
wherein one of the two spatial areas is machine-fixed;
means for determining that:
(a) the second spatial area does not penetrate the first spatial area, in the event that the first and second outer borders do not intersect each other, and
(b) neither of the first or second areas lies completely in the other of the first and second spatial areas; and
means for controlling a movement of the robot based on the results of the determining means.

20. Computer program product having program code stored on a non-transitory computer-readable storage medium, the program code, when executed by a controller associated with a multi-axis robot, causing the controller to:
determine whether a first outer border of a first spatial area and a second outer border of a second spatial area intersect each other;
determine a penetration of the first spatial area by the second spatial area, in the event that the first and second outer borders intersect each other;
wherein one of the first or second spatial areas is machine-fixed;
determine that:
(a) the second spatial area does not penetrate the first spatial area, in the event that the first and second outer borders do not intersect each other, and
(b) neither of the first or second areas lies completely in the other of the first and second spatial areas; and
control a movement of the robot based on the determining steps.

* * * * *